Reissued June 30, 1931

Re. 18,116

UNITED STATES PATENT OFFICE

IRA H. DERBY AND ORIN D. CUNNINGHAM, OF INDIANAPOLIS, INDIANA, ASSIGNORS TO PETER C. REILLY, INDIANAPOLIS, INDIANA

ORE FLOTATION PROCESS

No Drawing. Original No. 1,765,302, dated June 17, 1930, Serial No. 321,269, filed November 22, 1928. Application for reissue filed October 15, 1930. Serial No. 488,986.

The present invention relates to the froth flotation of minerals from ores, by the use of novel flotation ingredients, and is based upon our discovery that the reaction product of silicon sulfide with a group of substances, of which sodium alcoholate furnishes the typical example, produces a series of bodies having valuable floatation properties, when used in conjunction with a frothing agent, for the separation of minerals from ores.

The following reaction illustrates one reaction which may take place, sodium ethylate being shown in this reaction, but it will be understood that the methylate as well as its homologues and other substances as noted below, can be similarly employed.

$$\text{(I)}\quad SiS_2+NaOC_2H_5=SSi\begin{matrix}OC_2H_5\\SNa\end{matrix}$$

It is further to be understood that the other alkali metal compounds such as the potassium compounds may be also employed. It has also been found that absolute alcohol itself can under some conditions be substituted for the ethylate, producing the corresponding acid, in accordance with the following reaction, (representing one of the reactions which appears to take place).

$$\text{(II)}\quad SiS_2+HOC_2H_5=SSi\begin{matrix}OC_2H_5\\SH\end{matrix}$$

The above substances namely thio-silico-oxy-ethyl sodium sulfid and thio-silico-oxy-ethyl-thio acid are to be regarded as typical of the alkyl compounds of the class mentioned. Of these compounds the ethyl derivatives have been found to be very satisfactory, and it is also found that the methyl compounds can be used. There appears to be no particular advantage in using the higher alkyl compounds such as propyl and butyl, which are more expensive than the ethyl compounds but they are also suitable.

In place of the ethyl alcohol and sodium ethylate in the above examples, sodium cresylate or phenate, sodium mercaptol, sodium cyclohexanol, mixed sodium salts of tar acids, also the cresol, phenol, tar acids, hydrogenated phenols (e. g. cyclohexanol), mercaptol, or mixtures thereof, can be used.

It will be understood that sodium compounds are herein referred to, but obviously the potassium, calcium, barium or strontium compounds can be used, the group of metals hereinafter being referred to in the term "alkali-forming metal".

We have indicated one type of reaction product that may be obtained by the reaction of silicon sulfide ($SiS_2$) on the above classes of substances. We do not, however, limit ourselves to any type of reaction or reaction products. The products formed may be characterized as thiosilicic acid organic compounds. In some cases, when mercaptols are used, say sodium ethyl mercaptol, a compound $$SSi\begin{matrix}SC_2H_5\\SNa\end{matrix}$$

may be formed, and that when sodium cresylate is used, a compound $$SSi\begin{matrix}OCH_3C_6H_5\\SNa\end{matrix}$$

may be formed, and when the hydroxy compound, say phenol is used, the compound $$SSi\begin{matrix}OC_6H_5\\SH\end{matrix}$$

may be formed.

These compounds may be considered as mono-esters of thiosilicic acid and examples are the "thio-silico-sulf-ethyl sodium sulfide", the "thio-silico-oxy-tolyl sodium sulfide" and the "thio-silico-oxy-phenyl-thio acid" compounds of which the formulas have just been recited.

Thus it is seen that in Formula (I) given above, the O can be replaced by S, and that the $C_2H_5$ can be replaced by another alkyl group or by an aryl group or an aralkyl group, and that the sodium can be replaced by hydrogen (as in Formula (II)) or by another alkali-forming metal.

In the preparation of the flotation reagent of our invention, generally stated it is sufficient to select the desired organic compound and to react thereupon with silicon sulfide in any desired proportion, and at a temperature sufficiently high to bring about a ready reaction, and with agitation and trituration of the reaction mixture. Many of the reactions have been found to occur at ordinary room temperature.

By reacting with ethyl chlorid on the salt $$SSi\begin{cases}OC_2H_5\\SNa\end{cases}$$

we may form the ester $$SSi\begin{cases}OC_2H_5\\SC_2H_5\end{cases}$$

or with methyl chlorid we may form a mixed ester $$SSi\begin{cases}OC_2H_5\\SCH_3\end{cases}$$

The latter case (reaction with methyl chloride) might be expressed $$SSi\begin{cases}OC_2H_5\\SNa\end{cases}+CH_3Cl=SSi\begin{cases}OC_2H_5\\SCH_3\end{cases}+NaCl$$

In place of the above mentioned compounds, various organic derivatives of other silicon-sulfur compounds may be used as flotation agents, notably silicon chlor-hydrosulfid, $SiCl_3SH$ or the salts or esters thereof. The silicon chlor-hydrosulfid can be prepared in known manner by reacting on silicon chlorid with $H_2S$ at about a red heat. The corresponding fluorin compounds also can be employed.

In the flotation or ores by the use of the above products, the said products may be used in froth flotation, in conjunction with a frothing agent, such as pine oil or a tar oil distillate. The said reagent and the frothing agent can be thoroughly mixed with the ore pulp, for example in a tube mill or other device in which the ore pulp is being produced, and the amount of the said reagent may be varied between wide limits depending upon the nature of the ore under treatment. For many cases about 0.05 to 0.2 pounds of the silicon-sulfur-containing reagent per ton of ore will be found satisfactory. The pulp is then subjected to the ordinary aeration flotation (or froth flotation) operation, producing a foam carrying the sulfide mineral from the ore. The flotation can be conducted in a neutral, alkaline or acid circuit, as desired.

We claim:

1. A process which comprises subjecting ores to froth flotation in the presence of a compound having the general structure $$SSi\begin{cases}DR\\SM\end{cases}$$

in which D represents a diad metalloid element oxygen or sulfur, R represents an alkyl, aralkyl or aryl group and M represents alkali-forming metal or hydrogen or alkyl, aryl or aralkyl.

2. A process for effecting the froth-flotation of minerals from ore materials which comprises subjecting the same in a liquid vehicle to flotation in the presence of a frothing agent and a thio compound of thio-silico oxy-alkyl.

3. A process for effecting the froth-flotation of minerals from ore materials which comprises subjecting the same in a liquid vehicle to froth-flotation in the presence of an alkali-forming metal thio compound of thio-silico oxy-alkyl.

4. A process for effecting the froth-flotation of minerals from ore material which comprises subjecting the same in a liquid vehicle to froth-flotation in the presence of a frothing agent and thio-sodium thio-silico-oxyethyl.

5. A process for effecting the froth-flotation of minerals from ore materials which comprises subjecting the same in a liquid vehicle to froth-flotation in the presence of a frothing agent and a compound containing the acid radical of a thio-silico oxy-alkyl thio acid.

6. A process which comprises froth-flotation of ores in the presence of an organic silicon-sulfur compound.

7. A process of effecting the froth-flotation of minerals in the presence of the herein described flotation reagent which comprises a reaction product of silicon sulfide with a substance selected from the herein described group consisting of an alcohol, an alcoholate, alkali metal cresylate, alkali metal phenate, alkali metal mercaptol, alkali metal cyclohexano, mixed salt of tar acid, mercaptols and hydrogenated phenols including cyclohexanol.

8. A process which comprises froth-flotation while in the presence of the herein described flotation reagent which is a reaction product of silicon sulfide and a hydrogenated phenol.

9. A process which comprises froth-flotation while in the presence of the herein described flotation reagent which is a reaction product of silicon sulfide and an alkali metal salt of hydrogenated phenols.

Signed at Indianapolis, Indiana, this 13th day of October, 1930.

IRA H. DERBY.
ORIN D. CUNNINGHAM.

CERTIFICATE OF CORRECTION.

Reissue Patent No. 18,116. Granted June 30, 1931, to

IRA H. DERBY ET AL.

It is hereby certified that error appears in the printed specification of the above numbered patent requiring correction as follows: Page 2, line 76, claim 4, for the word "material" read materials; same page, lines 98 and 99, claim 7, for "cyclohexano" read cyclohexanol, and in line 99, for "salt" read salts; and that the said Letters Patent should be read with these corrections therein that the same may conform to the record of the case in the Patent Office.

Signed and sealed this 11th day of August, A. D. 1931.

Wm. A. Kinnan,
Acting Commissioner of Patents.

(Seal)